Patented Feb. 24, 1931

1,794,219

UNITED STATES PATENT OFFICE

HERMANN WAGNER, OF BAD-SODEN, AND KARL BECK, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

AZO DYESTUFFS AND MATERIAL DYED WITH THEM

No Drawing. Application filed October 19, 1928, Serial No. 313,638, and in Germany October 21, 1927.

The present invention relates to new azo dyestuffs and material dyed with them.

We have found that new valuable azo dyestuffs of excellent fastness and of favorite tints are obtained, by coupling in the usual manner in substance or on the fiber, a diazotized 2.3-aminonaphthoic acid ester or a substitution product thereof with a napthol or with a 2.3-hydroxynaphthoic acid arylamide or a substitution product thereof. The dyestuffs of the present invention are characterized by the following formula:

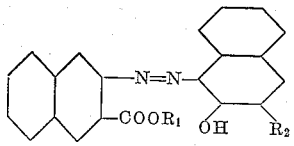

wherein $R_1$ stands for an alkyl group, $R_2$ stands for hydrogen or the group —CO.NH.aryl and wherein the aryl nuclei may contain substituents, such as the $NO_2$-group or halogen, but containing no free sulfonic acid or carboxylic acid-group. The properties as to fastness peculiar to these dyestuffs could not be expected, because saponification of the ester group had to be reckoned with and dyestuffs containing a free carboxylic acid group are of no commercial value an account of their solubility in alkalies. The saponification does not occur under the existing circumstances. As compared with similar dyestuffs of the napthol-group or 2.3-napthol-carboxylic acid arylid group, the dyestuffs of the present invention are distinguished by their excellent fastness to light.

The following examples serve to illustrate our invention, but they are not intended to limit it thereto.

1. 2.3-aminonaphthoic acid methylester yields, when coupled with 2.3-hydroxynaphthoic acid-para-anisidid, a bright bluish-red tint of fairly good fastness to kier-boiling and of good fastness to light, and gives also very brilliant shades.

The dyestuff has the following probable formula:

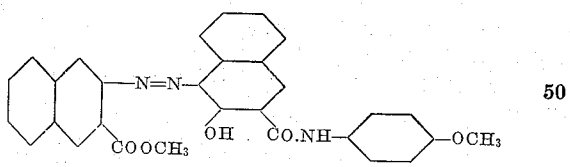

(a) There is first prepared a grounding liquor by means of: 4.5 grams of 2.3-hydroxynaphthoic acid-para-anisidid, 9 cc. of Turkey red oil of 50% strength, 9 cc. of caustic soda solution of 34° Bé., made up with water to 1 liter, to which is then added 4.5 cc. of formaldehyde of 30% strength.

(b) The dyeing bath is prepared as follows: 2.03 grams of 2.3-aminonaphthoic acid methylester are diazotized with 2.8 cc. of hydrochloric acid of 22° Bé. and 0.75 grams of dissolved sodium nitrite with addition of ice. After the diazotization is complete, the mass is neutralized with about 2.5 grams of sodium acetate and the whole is made up with addition of 25 grams of dissolved sodium chloride to 1 liter.

(c) The dyeing process is carried out as follows: 50 grams of boiled cotton yarn are treated for ½ hour in the grounding liquor, freed from water by squeezing out or hydro-extracting and thereupon the material is dyed for ½ hour in the dyeing bath. Finally the material is rinsed, soaped in a boiling solution, again rinsed and dried.

2. 2.3-aminonaphthoic acid ethylester gives, when coupled with 2.3-hydroxynaphthoic acid-β-naphthylamide, a bluish-red tint of fairly good fastness to kier-boiling.

(a) There is first prepared a grounding liquor by means of: 2 grams of 2.3-hydroxynaphthoic acid-β-naphthylamide 4 cc. of Turkey red oil of 50% strength, 6 cc. of caustic soda solution of 34° Bé., 500 cc. of boiling water, 2 cc. of formaldehyde of 30% strength, the whole being made up to 1 liter.

(b) The dyeing bath is prepared as follows: 2.18 grams of 2.3-aminonaphthoic acid ethylester are diazotized with 2.8 cc. of hydrochloric acid of 22° Bé. and 0.75 grams of dissolved sodium nitrite with addition of ice. After the diazotization is complete, the mass is neutralized with about 2.5 grams of sodium acetate and the whole is made up with addition of 25 grams of dissolved sodium chloride to 1 liter.

(c) The dyeing process is carried out as follows: 50 grams of boiled cotton yarn are treated in a grounding liquor for ½ hour, then well freed from water by squeezing out or by hydro-extracting, whereupon the material is dyed in the dyeing bath for ½ hour.

The material is rinsed, soaped in a boiling solution, again rinsed and dried.

3. By using the 2.3-hydroxynaphthoic acid-β-naphthylamide, a Bordeaux red tint is obtained of fairly good fastness to kier-boiling and on the other hand by using the 2.3-hydroxynaphthoic acid-β-naphthylamide and aminonaphthoic acid methylester, a bright bluish-red as well as pink tint can be obtained of fairly good fastness to kier-boiling.

4. 2.3-aminonaphthoic acid methylester yields, when coupled with 2.3-hydroxynaphthoic acid-5'-chloro-2'-anisidid ($NH_2=1$) a bluish-red tint, which is especially suitable for dyeing pink tint.

(a) There is first prepared a grounding liquor by means of: 4 grams of 2.3-hydroxynaphthoic acid-5'-chlor-2'-anisidid $$(NH_2=1),$$

8 cc. of Turkey red oil of 50% strength, 8 cc. of caustic soda solution of 34° Bé., 500 grams of boiling water, 4 cc. of formaldehyde of 30% strength the whole being made up to 1 liter.

(b) The dyeing bath is prepared as follows: 2.03 grams of 2.3-aminonaphthoic acid methylester are diazotized with 2.8 cc. of hydrochloric acid of 22° Bé. and 0.75 grams of dissolved sodium nitrite with addition of ice. After the diazotization is completed, the mass is neutralized with about 2.5 grams of sodium acetate and the whole is made up with addition of 25 grams of dissolved sodium chloride, to 1 liter.

(c) The dyeing process is carried out as follows: 50 grams of boiled cotton yarn are treated in a grounding liquor for ½ hour, then well freed from water by squeezing out or hydro-extracting, whereupon the material is dyed in the dye bath for ½ hour.

The material is finally rinsed, soaped in a boiling solution, again rinsed and dried.

5. By substituting in Example 4 for 2.3-aminonaphthoic acid methylester the corresponding ethylester and using instead of 2.3-hydroxynaphthoic acid-5'-chloro-2'-anisidid ($NH_2=1$), the 2.3-hydroxynaphthoic acid-4'-chloro-2'-anisidid ($NH_2=1$), a dyestuff is obtained yielding dyeings of a similar shade and of similar properties.

6. By using in the preceding examples instead of 2.3-aminonaphthoic acid methyl- or ethylester, a homologous ester, there are in analogous manner obtained dyeings of similar properties.

7. If the dyeings are produced in a weaker concentration, tints of a beautiful pink tone and of excellent properties as to fastness are obtained.

The grounding liquor for pink shades is prepared by means of: 0.25 grams of 2.3-hydroxynaphthoic acid-4'-anisidid ($NH_2=1$), 0.5 cc. of Turkey red oil of 50% strength and 1 cc. of caustic soda solution of 34° Bé., 100 cc. of boiling water, the whole being made up to 1 liter.

The dye bath is prepared as follows: 0.5 grams of 2.3-aminonaphthoic acid methyl ester, 0.7 cc. of hydrochloric acid of 22° Bé., 0.19 grams of dissolved sodium nitrite, 20 cc. of ice water, 0.6 grams of dissolved sodium acetate, 10 grams of sodium chloride, the whole being made up to 1 liter. The material is dyed and treated in the manner above set forth.

8. Instead of producing the dyestuffs on the fiber according to the preceding examples, they may also be prepared in substance and isolated in the usual manner.

The coupling solution is prepared with the following ingredients: 29.3 grams of 2.3-hydroxynaphthoic acid-para-anisidid, 8 grams of caustic soda solution of 10% strength, 100 grams of water, the whole being made up to 250 cc., 20 grams of sodium carbonate and 200 grams of water, 2 grams of Turkey red oil.

The diazo solution is composed as follows: 20.1 grams of 2.3-aminonaphthoic acid methylester, 48 grams of hydrochloric acid of 20° Bé., 50 grams of water, 7 grams of sodium nitrite, 18 grams of water, the whole being made up to 500 cc.

This diazo solution is run, while stirring, in the course of ½ hour at about 15° C. into the coupling solution. After the formation of the dyestuff is complete, the product is rendered slightly acid to Congo-red paper and filtered. The dyestuff yields a beautiful bluish-red paste.

The dyestuff thus prepared and isolated is identical with the dyestuff produced on the fiber according to Example 1. It has a clear bluish-red tint, possesses a good tinctorial power and an excellent fastness to light. It dissolves in concentrated sulfuric acid to a solution of a reddish hue and in glacial acetic acid and in benzene to a red solution. It is suitable for the preparation of graphic colors, painting colors and colors for wall-paper.

Of course, the other dyestuff combinations specified in Examples 2—7, may be prepared in substance by the method just described.

The dyestuffs in question may be used as such or mechanically mixed in a dry way with one of the usual substrata, for instance with hydrate of alumina, heavy spar, blanc fixe or with a mixture of these substances and then rubbed with varnish and printed, or rubbed, for instance, with an oil or a lake and then spread on the material. The dyestuff may also be used in the form of an aqueous paste mixed with one of the above mentioned dry or water-moist substrata, then dried and as above mentioned rubbed with varnish etc. In all these cases the dyestuffs yield very intense, clear shades of very good fastness to light.

The preparation of the dyestuffs can of course also be carried out in the presence of one of the above mentioned substrata, as, for instance, hydrate of alumina, heavy spar, blanc fixe or a mixture of these substances.

Owing to their said excellent properties the dyestuffs can not only be used in cotton dyeing but also as graphic colors, painting colors, colors for wall-paper and so on. They possess in a high degree the properties required for the said purpose, such as fastness to light, and towards oil and lake.

We claim:

1. As new products, dyestuffs which contain no free sulfonic acid or carboxylic acid groups, having the following general formula:

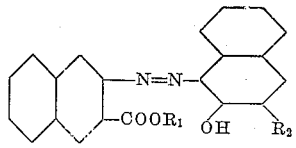

wherein $R_1$ stands for an alkyl group, $R_2$ for hydrogen or the group —CO.NH.aryl and wherein the aryl nuclei may contain substituents such as the $NO_2$ group or halogen, said dyestuffs yielding a red to bluish-red tint and possessing a good tinctorial power and an excellent fastness to light, being suitable for being produced on the fiber and also for the preparation of graphic colors, painting colors and colors for wall-paper or the like.

2. As new products, dyestuffs which contain no free sulfonic acid or carboxylic acid groups, having the following general formula:

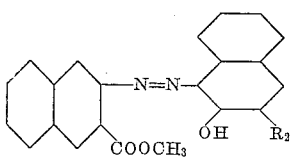

wherein $R_2$ stands for hydrogen or the group —CO.NH.aryl and wherein the aryl nuclei may contain substituents such as $NO_2$ or halogen, said dyestuffs yielding a red to bluish-red tint and possessing a good tinctorial power and an excellent fastness to light, being suitable for being produced on the fiber and also for the preparation of graphic colors, painting colors and colors for wall-paper or the like.

3. As new products, dyestuffs which contain no free sulfonic acid or carboxylic acid groups, having the following general formula:

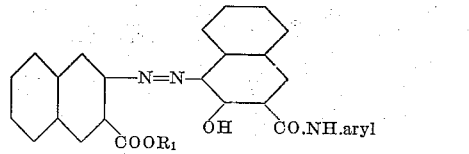

wherein $R_1$ stands for alkyl and wherein the aryl nuclei may contain substituents such as $NO_2$ or halogen, said dyestuffs yielding a red to bluish-red tint and possessing a good tinctorial power and an excellent fastness to light, being suitable for being produced on the fiber and also for the preparation of graphic colors, painting colors and colors for wall-paper or the like.

4. As new products, dyestuffs which contain no free sulfonic acid or carboxylic acid groups, having the following general formula:

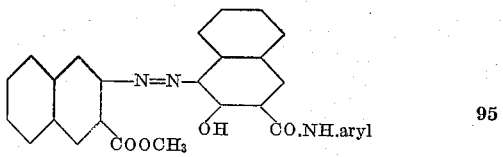

wherein the aryl nuclei may contain substituents such as the $NO_2$-group or halogen, said dyestuffs yielding a red to bluish-red tint and possessing a good tinctorial power and an excellent fastness to light, being suitable for being produced on the fiber and also for the preparation of graphic colors, painting colors for wall-paper or the like.

5. As a new product, the dyestuff of the following formula:

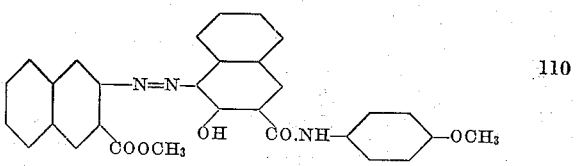

said dyestuff yielding a bright bluish-red tint, possessing a good tinctorial power and an excellent fastness to light, dissolving in concentrated sulfuric acid to a blue solution with a reddish hue and in glacial acetic acid and in benzene to a red solution, being suitable for being produced on the fiber as well as for the preparation of graphic colors, painting colors and colors for wall-paper or the like.

6. Material dyed with dyestuffs as claimed in claim 1.

7. Material dyed with the dyestuffs as claimed in claim 2.

8. Material dyed with the dyestuffs as claimed in claim 3.

9. Material dyed with the dyestuffs as claimed in claim 4.

10. Material dyed with the dyestuff as claimed in claim 5.

In testimony whereof, we affix our signature.

HERMANN WAGNER.
KARL BECK.